March 17, 1970     F. ROINER     3,500,542
METHOD AND APPARATUS FOR THE MANUFACTURE OF CHEESE
Filed April 3, 1968     3 Sheets-Sheet 1

INVENTOR
FRANZ ROINER
By Stevens, Davis, Miller & Mosher
ATTORNEYS

INVENTOR
FRANZ ROINER

March 17, 1970  F. ROINER  3,500,542
METHOD AND APPARATUS FOR THE MANUFACTURE OF CHEESE
Filed April 3, 1968  3 Sheets-Sheet 3

INVENTOR
FRANZ ROINER
By Stevens, Davis, Miller & Mosher
ATTORNEYS

United States Patent Office 3,500,542
Patented Mar. 17, 1970

3,500,542
METHOD AND APPARATUS FOR THE
MANUFACTURE OF CHEESE
Franz Roiner, Deggendorfer Str. 16,
Bogen (Danube), Germany
Filed Apr. 3, 1968, Ser. No. 718,414
Claims priority, application Germany, Apr. 4, 1967,
R 45,683; May 20, 1967, R 46,067
Int. Cl. A01j 25/11; A23l 3/00; C12h 1/06
U.S. Cl. 31—46                                    24 Claims

ABSTRACT OF THE DISCLOSURE

Cheese is made in a continuous operation wherein separate batches of milk are fermented and coagulated in a sequence so timed and adjusted as to provide substantially continuous discharge of cut coagulum into a curd separating and working vessel. This vessel is provided with a plurality of baffles and/or other deflecting means whereby as the coagulum passes therethrough the curd is gently agitated and worked with substantially complete separation of whey without coalescing into larger particles. This vessel may be constructed as a stationary trough arranged at an incline sufficient to establish the desired flow by gravity. In another embodiment, the separating and working device may be tubular and provided with means for rotation about the longitudinal axis.

---

The present invention relates to a method and equipment for manufacturing cheese curd in which the separation of the whey from the coagulated milk is effected by automatically and mechanically subdividing the curd.

At the present time it is the common practice in cheese making to work the coagulum in batches usually in large vats. For this purpose, heated milk which has been inoculated with a culture of cheese-making bacteria and, after the desired development, the thus-treated milk is coagulated by addition of rennet. The cheese curd is obtained by cutting the coagulum and separating the whey by stirring or otherwise manipulating the curd. Such a batch method of manufacture entails a series of interruptions in the operation for emptying the curding vats, along with much hand labor. It is therefore time-consuming and expensive.

These and other drawbacks are eliminated by the present invention whereby the cheese-forming process is carried out in a continuous flow process through a plurality of stages, in the first of which the fresh milk is charged into an inclined treating vessel and treated with a suitable bacterial culture and rennet in the usual manner. The resulting coagulum is allowed to slide down the vessel for discharge at the lower end through a stationary cutting grid. The thus-cut coagulum is discharged into a downwardly-inclined trough wherein the material passing through the trough is exposed to a series of staggered baffles or other deflecting surfaces. In this way, it is possible rapidly and gently to recover the curd from a moving coagulum. In this connection, it is unimportant how much coagulum is to be worked in each case. The cheesemaking process takes place always in a continuous flow. It takes place upon impingement of the coagulated fermented milk material which moves under the action of gravity against the said staggered baffles or other deflecting means. By controlling the velocity at which the mixture of curds and whey impinges upon the baffles or edges, the degree of firmness of the cheese can be regulated.

As a special development of the invention, at the beginning of the cheese-making process, the milk will be fermented in at least two treating troughs which are discharged alternately to the trough provided for the separation of the whey. By thus successively charging batches of coagulum to the treating trough the over-all cheesemaking operation is carried out rapidly and efficiently.

For carrying out the method there can be used a new and improved apparatus which is characterized by a helical arrangement of the duct-shaped trough in a vertical direction, wherein the baffles may extend inwardly from the side walls of the trough from its bottom to beyond the center of the free space of the trough. However, it is also possible in accordance with the invention to provide a subdivision of the duct-shaped trough into duct sections which are inclined and staggered vertically with respect to each other.

The discharge of the fermenting and coagulating vessels may be effected, in accordance with another feature of the invention, by slides or valves, located in the lower ends thereof. As a further development in accordance with the invention, the apparatus may be provided with an undulating bottom surface over which the mixture of curds and whey flows through the equipment. This measure assists in control of the flow of the mass through the apparatus as well as in the uniform cheesing of each individual curd grain while at the same time preventing such curd grains from growing together.

As an advantageous further embodiment of the invention, the curd separating and treating means may be a rotatable liquid-impermeable pipe having an end section through which liquid can pass. As a further feature of this embodiment, the tube may have a polygonal free cross-section with or without deflection baffles. Alternatively, the tube may have a circular cross-section, in which case deflection baffles should be provided therein.

Discharge for whey and other liquids may be provided at the end of these tubes by suitable small openings such as boreholes therein.

The rate of passage of the cheese curd through the rotary tube, may be controlled by its speed of rotation through a suitable adjustable or controllable drive means. Such, however, are conventional and not part of this invention. If desired, the inclination of the rotary tube can be made adjustable instead of or in addition to, controlling the speed of rotation, for this purpose.

Instead of a cylinder, the tube may be in the form of a cone having a cross-section which increases from the inlet to the outlet end, in which connection the conicity or widening of the tube would be determined in accordance with the desired speed of passage of the cheese curd and the speeds of rotation employed. The axis of rotation of such a conical tube would ordinarily extend horizontally, but might be tilted, if desired.

Further details of the invention will be apparent from the following description taken in conjunction with the accompanying drawings wherein.

Figure 1:
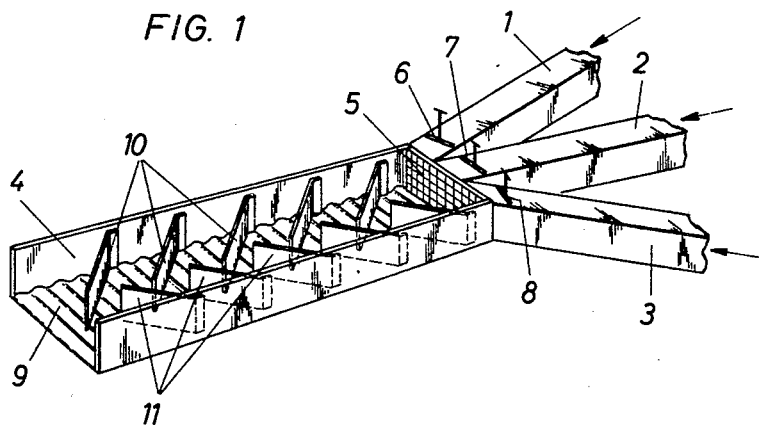
FIGURE 1 shows in perspective an apparatus for the carrying out of the method of the invention in which an inclined stationary trough is provided.
Figure 2:
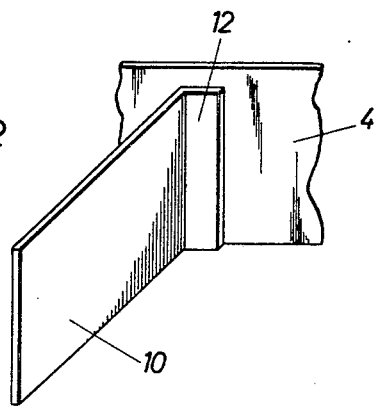
FIGURE 2 shows, also in perspective, an individual baffle of the trough of FIGURE 1.

Referring to FIGURE 1, the pre-run or coagulation vessels 1, 2 and 3, provided with slide closure means, 6, 7 and 8 respectively, for discharge into the upper end of the separating and working trough 4. Across inlet end of trough 4 there extends a cutting grid 5, while the bottom 9 of the trough is fluted or undulated. From the side walls of trough 4 plates 10 and 11 extend as baffles to beyond the center of the free space of the trough. FIGURE 2 shows in some detail a single baffle 10, having end 12, firmly affixed to the side wall of trough 4, by welding or other conventional means.

Since the coagulum must be brought as compactly as possible to the cutting grid 5 in order to assure the production of curd particles of approximately equal size, pre-treatment, more particularly the renneting, is carried out in the pre-run vessels 1, 2 and 3. The renneting time is shortened as much as possible and furthermore the presence of several pre-run vessels and the correspondingly developed adjacent trough bed see to it that the milk is not agitated during the thickening so as to cause blocking of the casing. The pre-run vessels 1, 2, 3 are connected with a pipe (not shown) for filling with the prepared milk. In this connection the several pre-run vessels are filled sequentially in a predetermined time cycle adjusted to the fermentation and coagulation reaction. While these reactions are proceeding in vessels 1 and 2, they have already proceeded to a sufficient extent in the first filled vessel 3, so the coagulum therein can be discharged by opening valve 8, against the cutting grid 5, and into trough 4. After thus emptying vessel 3 the slide 8 is closed and another preparation of coagulum is effected in this vessel. During this time, the pre-run vessel 1 is emptied by opening the slide 6 and this cycle then takes place continuously over the individual pre-run vessels 1 to 3. In this way, although the reactions in vessels 1, 2 and 3 are necessarily batchwise, the filling times and reaction times are so coordinated that there is a substantially continuous flow of milk into coagulating vessels 1, 2, 3, and a continuous discharge of the coagulum by this sequential opening of the slides 6 to 8 and discharge of the contents through the cutting grid 5 with simultaneous continuous flow of the curd into the trough 4.

In this vessel, which is the most important for the production of the cheese, cheese curd is separated from the whey by the mixture impinging against the baffles 10 and 11 as well as the effect of the fluted or corrugated bottom 9 of the trough, and the separated curd is conducted further, floating in the whey, whereby an extremely gentle and at the same time adjustable discharge is obtained. The velocity of flow is determined by the slope of the trough 4. By a suitable selection of this gradient a uniforming cheesing of the individual particles of curd is effected while at the same time coalescing thereof is prevented. The separation of curd from the whey continues from the cutting grid 5 and is completed upon discharge from trough 4, from which the separated curd is washed, heated, cooled and/or salted or seasoned to produce the desired cheese product. The baffles are not limited to a single form as represented by the plates 10 in FIGURES 1 and 2, extending from the lateral walls of the trough 4 but may also take the form of inclined planes 13 over the fluted or undulated bottom 9 of the trough, as shown in FIGURE 3.

Figure 4:
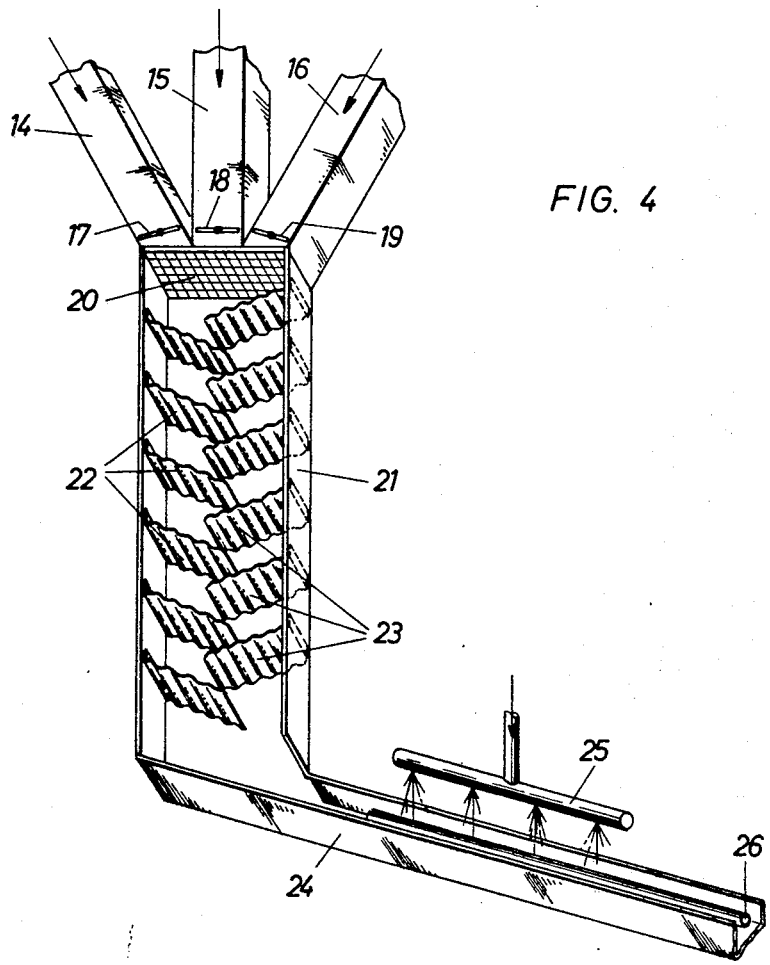
FIGURE 4 is a view of a trough designed for vertical installation, also shown in perspective, the front wall of the arrangement being cut away to reveal the interior arrangement.

In accordance with FIGURE 4, the method of the invention can also be carried out in a vertical arrangement. The preparation of the coagulum is in this case again effected in fermentation and coagulating vessels 14, 15 and 16. The finished curd is discharged cyclically into separating vessel 21 by opening the appropriate slide valve 17, 18 or 19. Vessel 21 is subdivided into a plurality of sections which are staggered vertically with respect to each other and defined by the alternately arranged baffles 22 and 23. The separation of the whey takes place by reason of the successive impacts as the curd particles strike against the baffles 22 and 23, defining the several sections of this vessel. The separated pieces of the thus-treated curd collect and float upon the whey collecting in the bottom of vessel 21 and are withdrawn via the duct 24. If desired, the curd may be further treated in duct 24, such as washing with water sprayed thereover through the system of pipes 25 and cooling or heating thereof by a suitable medium flowing through pipes 26.

Figure 3:
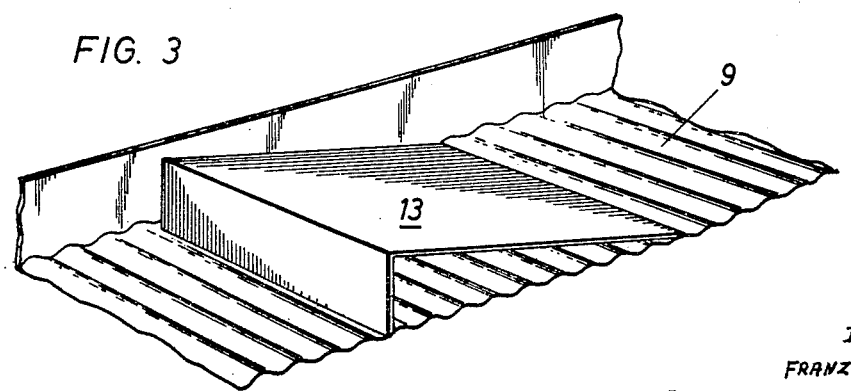
FIGURE 3 shows another embodiment of such a baffle, again in perspective, the undulated or fluted bottom of the trough being also visible.
Figure 5:
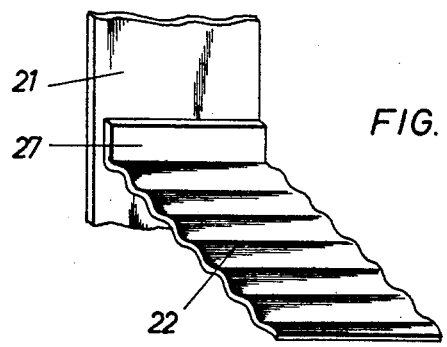
FIGURE 5 shows the development of a baffle such as used in the vertical trough of FIGURE 4.

As shown in FIGURE 5, the ends 27 of baffles 22 or 23 may be bent transversely thereof, to provide for attachment to the wall of vessel 21, by welding or other means, and fluted or corrugated to increase the agitation of the curd particles passing thereover, similar to bottom 9 in FIGURE 3.

Figure 6:
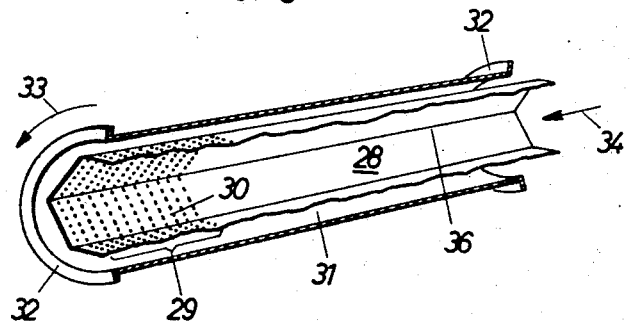
FIGURE 6 shows another embodiment of the invention, namely a perspective view of a rotary tube trough of hexagonal cross-section cut open in longitudinal direction.

In the embodiment of FIGURE 6, the separating means consists of a tube 28 of hexagonal cross-section which is provided with a plurality of openings 30 at the discharge end section 29. The tube 28 is mounted within and connected to supporting tube 31 which has two runner rings 32, in a conventional manner by means which are omitted from the drawing for greater clarity thereof.

The runner rings 32 support tube 31 with its inner tube 28 for rotation in the direction indicated by the arrow 33 on a frame, not shown. The drive can be effected in any suitable manner, for instance by motor-driven friction wheels engaging on the rings 32 or by a pinion which is connected with the motor via a gearing and engages with a corresponding toothed ring on the tube 31. The axis of rotation of the tube 28 is inclined in the present case with respect to the horizontal so that the perforated section 29 of the tube 28 lies at the lowest point and the mixture of curds and whey, charged into the tube 28 at the end opposite said section 29, can move continuously therethrough under the action of gravity in the tube 28 in the direction indicated by the arrow 34, this movement being further assisted by the rotation of the tube.

Figure 7:
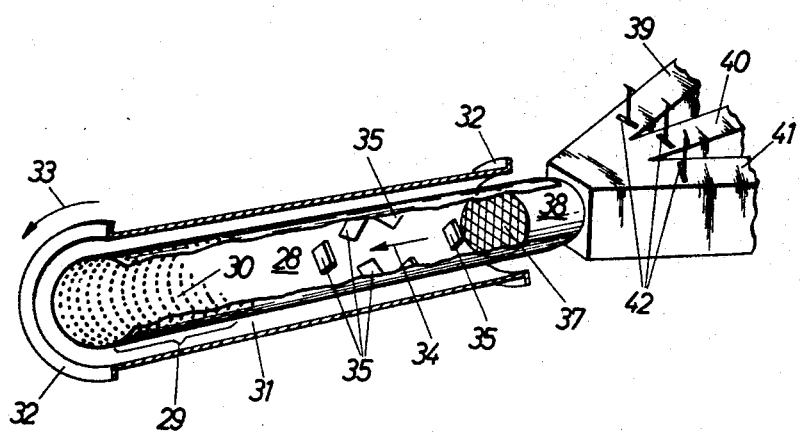
FIGURE 7 is a corresponding view of another embodiment wherein the rotary-tube trough has a circular cross-section and built-in deflection baffles.

The apparatus shown in FIGURE 7 differs from that of FIGURE 6 merely by the fact that the tube 28 is of circular cross-section and is provided with baffles 35. Such baffles can also be provided in the hexagonal tube 28 of FIGURE 6 but this is not absolutely necessary since the angular plane surfaces which are already present there exert the function of such baffles 35 which slightly retard the flow of the milk material in the tube 28 for the separation of cheese curd and whey from each other upon the rotation of the tube, but do not prevent it. The baffles 35 may be in the form of discs which are fastened to the wall of the tube 28 and protrude from same.

In FIGURE 7 there is also shown the milk treating unit with which the tube 28 cooperates. This pre-treatment unit consists of a stationary cutting grid 37 which is arranged at the outlet of discharge throat 38 connected by a manifold with the milk treating vessels 39, 40 and 41, each of which is closed or opened by movement of its associated slide or valve 42.

The operation of the apparatus of FIGURES 6 and 7 will now be described with reference to FIGURE 7. In order to bring the coagulated milk, i.e. the coagulum, in as compact a manner as possible to the cutting grid 37 so that particles of curd of approximately the same size are formed, the pre-treatment of the milk from which cheese is to be made and in particular the renneting thereof takes place in the pre-run vessels 39, 40 and 41. These pre-run vessels as well as the connection 38 are so developed that the milk is relatively quiescent and thus the developing curd will not be disrupted so as precipitate finely divided casein. Also it will be understood that other conditions of temperature, acidity and the like are so controlled as to insure that the thickening takes place within relatively short periods of time.

The curd production vessels 39, 40 and 41 are so connected with a milk feed pipe, not shown in the drawing, that the milk is processed and the coagulum is discharged sequentially in a time cycle as described in respect of the embodiment of FIGURES 1 and 4. In this way the filling of the coagulating vessels 39, 40 and 41 proceeds more or less continuously while the coagulation is proceeding batchwise, and the resulting coagulum is being treated continuously in the rotating tube 28.

In this vessel, which is the most important for the cheese-making process, cheese curd is continuously separated from the whey by the cheese curd striking against the baffles 35 or by the polygonal development of the tube 28 and its simultaneous rotation and is conducted further floating in the whey which cannot escape due to the fact that the upper or forward section of the tube 28 is impermeable to liquid, whereby an extremely gentle and at the same time adjustable discharge results.

In the perforated end section 29 of the tube 28 the resultant whey escapes from the tube 28. In this way the separation of whey and cheese curd is substantially completed. The curd can now be washed, heated, cooled and/or salted and seasoned in accordance with the usual cheese-making procedures which it is not necessary to describe or illustrate in this specification. If desired a plurality of spray pipes may be arranged within the lower perforated section 29 of tube 28 and the discharge openings of tubes 28 and 31. Likewise, effective heating or cooling zones may be arranged according to the desired sequence of treatment along the longitudinal axis of the tube.

In the embodiment according to FIGURE 7, separation of the whey commences only a short distance behind the cutting grid 37 so that the whey serves to carry the cheese curd which floats thereon through the tube 28. By suitable selection of the speed of flow of the curd through the tube 28 there is obtained the desired uniform cheesing of the individual particles of curd and at the same time agglomeration is avoided. The speed of flow, i.e. the rapidity of the removal of the whey, can be adjusted by corresponding adjustment of the slope of the tube 28 and/or its speed of rotation. Where tube 28 is conically formed, the angle of the conical walls will also affect the rate of flow therethrough.

It should be understood of course that the foregoing disclosure relates to only preferred embodiments of the invention and that numerous modifications or alterations may be made therein without departing from the spirit and scope of the invention as set forth in the appended claims.

What is claimed is:

1. Apparatus for the continuous production of cheese curd comprising a plurality of coagulating vessels discharging into means for separating cheese curd from whey, said separating means comprising a duct, means for subdividing a mass of curd entering into said duct, a plurality of surface elements within said duct so arranged and disposed that particles of curd passing through said duct will impinge against said surfaces successively, whereby whey is separated from said curd particles and said particles are worked, and means at the other end of said duct for discharging the separated and worked curd particles.

2. Apparatus according to claim 1 wherein said duct is in the form of a rectangular trough having a bottom wall and side walls and the surface elements comprise baffles arranged in a row along each side wall.

3. Apparatus according to claim 2 wherein the bottom of said trough is corrugated transversely thereof.

4. Apparatus according to claim 1 wherein the surface elements comprise a series of inclined planes extending outwardly of the bottom of said trough.

5. Apparatus according to claim 1 wherein the duct is in the form of a rotatable cylinder.

6. Apparatus according to claim 5 wherein the cylinder is polygonal in cross-section, and said surface elements are the walls thereof.

7. Apparatus according to claim 1 wherein said duct is arranged substantially vertically and said surface elements are in the form of sloping baffles extending from opposing walls of said duct in alternating overlapping relation.

8. Apparatus according to claim 1 including means for washing the separated and compacted curd.

9. Apparatus according to claim 5 wherein the surface elements are baffles disposed along the interior of the cylinder adapted to deflect the flow of materials therethrough.

10. Apparatus according to claim 5 wherein the cylinder is liquid impervious and the lower section thereof is provided with a plurality of perforations for draining whey from said cylinder.

11. Apparatus according to claim 1 wherein the duct is inclined with respect to the horizontal so that the discharge end of the duct lies at a lower point than the feeding end.

12. Apparatus according to claim 5 wherein the axis of rotation of the cylinder forming the duct is inclined with respect to the horizontal so that the discharge end of the duct lies at a lower point than the feeding end.

13. Apparatus according to claim 1 wherein the duct is in the form of a rotatable cone having a cross-section which increases from the inlet to the outlet end.

14. Apparatus according to claim 13 wherein the axis of rotation of the cone is arranged substantially horizontally.

15. Apparatus according to claim 13 wherein the axis of rotation of the cone is inclined with respect to the horizontal so that the axis on the discharge end lies at a lower point than on the feeding end.

16. Apparatus according to claim 11, wherein the inclination of the duct with respect to the horizontal is adjustable correspondingly to the desired speed of flow.

17. Apparatus according to claim 5, wherein the rotational movement of the duct is adjustable correspondingly to the desired speed of flow of the cut coagulum.

18. The method for making cheese continuously comprising preparing a plurality of batches of curd in a predetermined time sequence, progressively discharging said batches in order of completion, cutting each batch of curd as discharged, passing the cut curd particles successively over and into impinging contact with a plurality of surfaces whereby whey is separated from said curd particles and said particles are compacted without agglomeration, the time sequence being such that upon discharge of one of said batches another is ready for discharge.

19. The method according to claim 11 wherein the cut curd particles are rolled and tumbled against said surfaces while flowing on a current of separated whey.

20. Apparatus according to claim 6 wherein the axis of rotation of the cylinder forming the duct is inclined with respect to the horizontal so that the discharge end of the duct lies at a lower point than the feeding end.

21. Apparatus according to claim 12 wherein the inclination of the duct with respect to the horizontal is adjustable correspondingly to the desired speed of flow.

22. Apparatus according to claim 15 wherein the inclination of the duct with respect to the horizontal is adjustable correspondingly to the desired speed of flow.

23. Apparatus according to claim 6 wherein the rotational movement of the duct is adjustable correspondingly to the desired speed of flow of the cut coagulum.

24. Apparatus according to claim 13 wherein the rotational movement of the duct is adjustable correspondingly to the desired speed of flow of the cut coagulum.

References Cited

UNITED STATES PATENTS 2,193,462   3/1940   Miollis _____ 99—116
3,130,744   4/1964   Collins _____ 31—46 X ALDRICH F. MEDBERY, Primary Examiner U.S. Cl. X.R.

99—48, 115